(12) United States Patent
Hori et al.

(10) Patent No.: US 7,005,397 B2
(45) Date of Patent: Feb. 28, 2006

(54) ELECTRODE FOR POLYMER ELECTROLYTE FUEL CELL AND METHOD OF PRODUCING THE SAME

(75) Inventors: Yoshihiro Hori, Ikoma (JP); Takeshi Yonamine, Suita (JP); Makoto Uchida, Hirakata (JP); Osamu Sakai, Neyagawa (JP)

(73) Assignee: Matsushita Electric Industrial Co., Ltd., Tokyo (JP)

( * ) Notice: Subject to any disclaimer, the term of this patent is extended or adjusted under 35 U.S.C. 154(b) by 267 days.

(21) Appl. No.: 10/253,823

(22) Filed: Sep. 25, 2002

(65) Prior Publication Data

US 2003/0059667 A1 Mar. 27, 2003

(30) Foreign Application Priority Data

Sep. 27, 2001 (JP) .............................. 2001-298060

(51) Int. Cl.
 *H01M 4/88* (2006.01)
 *H01M 4/92* (2006.01)
 *H01M 4/96* (2006.01)

(52) U.S. Cl. .......................... 502/101; 429/42; 429/44; 427/115

(58) Field of Classification Search ................. 429/40, 429/42, 44; 427/115; 502/101
See application file for complete search history.

(56) References Cited

U.S. PATENT DOCUMENTS

| 5,186,877 A | * | 2/1993 | Watanabe ................... 264/104 |
| 5,843,519 A | | 12/1998 | Tada |
| 6,492,295 B1 | * | 12/2002 | Hitomi et al. .............. 502/159 |
| 2003/0143454 A1 | * | 7/2003 | Hatoh et al. .................. 429/44 |

FOREIGN PATENT DOCUMENTS

| EP | 0 483 085 A2 | 4/1992 |
| JP | 2001-259431 | 9/2001 |
| WO | WO 01/99216 | * 12/2001 |

* cited by examiner

*Primary Examiner*—Jonathan Crepeau
(74) *Attorney, Agent, or Firm*—McDermott Will & Emery LLP

(57) ABSTRACT

The present invention provides an electrode for a polymer electrolyte fuel cell comprising a high-performance electrode catalyst particle which is sufficiently coated with a hydrogen ion conductive polymer electrolyte and has a water repellent material suitably supplied thereto for water management. The method of producing the electrode in accordance with the present invention comprises the steps of spraying a solution or dispersion of a hydrogen ion conductive polymer electrolyte into a dry atmosphere in which a catalyst particle comprising an electrically conductive carbon powder carrying a platinum group metal catalyst is flowing, to coat the catalyst particle with the polymer electrolyte, and then spraying a solution or dispersion of a water repellent material to the catalyst particle to attach the water repellent material to the catalyst particle.

6 Claims, 2 Drawing Sheets

ELECTRODE FOR POLYMER ELECTROLYTE FUEL CELL AND METHOD OF PRODUCING THE SAME

BACKGROUND OF THE INVENTION

The present invention relates to a polymer electrolyte fuel cell, particularly to a method of producing an electrode catalyst particle constituting a catalyst layer of an electrode of the polymer electrolyte fuel cell.

A fuel cell employing polymer electrolyte generates electric power and heat simultaneously by electrochemically reacting a fuel gas containing hydrogen and an oxidant gas containing oxygen such as air. This fuel cell is basically composed of a polymer electrolyte membrane for selectively transporting hydrogen ions, and a pair of electrodes respectively formed on both sides of the polymer electrolyte membrane. The electrode is constituted by a catalyst layer composed of an electrically conductive carbon powder carrying a platinum group metal catalyst and a hydrogen ion conductive polymer electrolyte mixed therewith, and a gas diffusion layer made of, for example, a water repellent treated carbon paper, which has both gas permeability and electronic conductivity and is formed on the outer surface of the catalyst layer.

Gas sealing members or gaskets are arranged on the periphery of the electrodes with the polymer electrolyte membrane disposed therebetween so as to prevent a fuel gas and an oxidant gas supplied to the electrodes from leaking out or prevent the two types of gases from mixing with each other. The gas sealing members or gaskets are combined integrally with the electrodes and polymer electrolyte membrane beforehand. This is called "MEA" (membrane electrode assembly). Disposed outside the MEA are conductive separator plates for mechanically securing the MEA and for connecting adjacent MEAs electrically in series. At a portion thereof to come in contact with the MEA, the separator plates have gas flow channels for supplying reactant gases to the electrodes and for removing a generated gas and excess gas. While the gas flow channels may be provided separately from the separator plates, grooves are usually formed on the surfaces of the separator plates to serve as the gas flow channels.

In general, the gas diffusion layer of the electrode of the polymer electrolyte fuel cell is composed of a porous carbon layer of a water repellent treated nonwoven carbon fabric or the like. In some cases, for the purpose of keeping the catalyst layer or the polymer electrolyte membrane humidified, a water repellent carbon layer is provided between the interface of the catalyst layer and the gas diffusion layer. Generally, the water repellent carbon layer is formed in the following manner.

First, carbon particles are mixed with a dispersion of polytetrafluoroethylene fine particles containing a surfactant, and the whole is subjected to a process such as drying or filtration, to give a mixture of carbon particles and polytetrafluoroethylene fine particles. Next, water or an organic solvent is added to the mixture to produce an ink. The ink thus produced is applied, by a process such as screen printing, spray coating, doctor blading or roll coating, onto one surface of a nonwoven carbon fabric which serves as the gas diffusion layer, followed by baking at a temperature from about 300° C. to about 400° C. to burn off the surfactant. In general, the water repellent carbon layer is formed on the gas diffusion layer in this manner. Herein, the gas diffusion layer is combined with the catalyst layer such that the water repellent carbon layer is in contact with the catalyst layer.

Meanwhile, the catalyst layer is usually composed of a thin coating film of a mixture of an electrically conductive carbon powder carrying a platinum group metal catalyst and a hydrogen ion conductive polymer electrolyte. At present, perfluorocarbon sulfonic acid is commonly used as the hydrogen ion conductive polymer electrolyte. The catalyst layer is formed in the following manner. An electrically conductive carbon powder carrying a catalyst such as platinum is mixed with a solution or dispersion of a polymer electrolyte, which is prepared by dissolving or dispersing a polymer electrolyte in an alcohol solvent such as ethanol. The mixture thus obtained is added with an organic solvent having a relatively high boiling point, such as isopropyl alcohol or butyl alcohol, to produce an ink. The ink is applied to a polymer electrolyte membrane or other substrate by a process such as screen printing, spray coating, doctor blading or roll coating, thereby forming a catalyst layer. Further, a polytetrafluoroethylene fine powder or a solution or dispersion thereof was added to the above-described ink in order to retain, in the vicinity of the reaction site in the catalyst layer, product water and water contained in the supplied gas, while discharging excess water to the outside.

Commercially available solutions or dispersions of a hydrogen ion conductive polymer electrolyte have a concentration of approximately 10%. Thus, in order to mix a hydrogen ion conductive polymer electrolyte with an electrically conductive carbon powder carrying a catalyst, a solution or dispersion of a polymer electrolyte containing a large amount of a solvent or dispersion medium has to be mixed with the electrically conductive carbon powder carrying a catalyst. This results in a reduced viscosity of the resultant ink, making it impossible to produce an ink having a sufficiently high viscosity required for a process such as screen printing. To solve this problem, a method has been employed, in which a solvent of an ink is evaporated to produce a high viscosity ink. However, it is difficult to prepare homogeneous ink by this method. Therefore, another method has also been employed, which involves: previously evaporating and solidifying a solution or dispersion of a hydrogen ion conductive polymer electrolyte; redissolving or dispersing it in an organic solvent or dispersion medium having a relatively high boiling point, such as isopropyl alcohol and butyl alcohol, to prepare a solution or dispersion containing a hydrogen ion conductive polymer electrolyte at a desired concentration; and producing an ink by using the solution or dispersion.

To achieve the practical utilization of the fuel cells, a further improvement in the power generating efficiency is required. To this end, it is important to attach, as uniformly as possible, a relatively thin layer of a hydrogen ion conductive polymer electrolyte on the surface of an electrically conductive carbon powder carrying a catalyst in the catalyst layer. Further, it is also important to attach such layer of a hydrogen ion conductive polymer electrolyte on as much catalyst as possible. At the same time, it is necessary to prevent a water repellent material, which is added into the catalyst layer for the purpose of water management, from coating the surface of a metal catalyst to reduce the reaction site.

However, since the conventional methods employ a catalyst ink prepared by mixing a catalyst powder, a solution or dispersion of a hydrogen ion conductive polymer electrolyte and a dispersion of a water repellent material, they have had a problem that the water repellent material adheres to the surface of the catalyst metal such as platinum to impede the supply of the reactant gases, thereby degrading the electrode performance. If the amount of the water repellent material to be added is decreased so as not to impede the supply of the reactant gases, a sufficient amount of the water repellent material required for water management cannot be added. The above-described reasons have posed a problem that a sufficient power generating property required for the practical utilization cannot be achieved for the fuel cells.

BRIEF SUMMARY OF THE INVENTION

It is an object of the present invention to provide an electrode for a polymer electrolyte fuel cell, comprising a high-performance electrode catalyst particle which is sufficiently coated with a hydrogen ion conductive polymer electrolyte and has a water repellent material suitably added therewith for water management.

The present invention provides an electrode for a polymer electrolyte fuel cell, including a catalyst layer comprising: a catalyst particle comprising an electrically conductive carbon powder carrying a platinum group metal catalyst; a hydrogen ion conductive polymer electrolyte; and a water repellent material, wherein the catalyst particle is coated with the hydrogen ion conductive polymer electrolyte on a surface thereof and the water repellent material is attached to an outer surface of the catalyst particle coated with the polymer electrolyte, the catalyst particle, the hydrogen ion conductive polymer electrolyte and the water repellent material constituting a granulated particle.

The present invention is based upon a finding that a suitable electrode particle, which comprises a catalyst particle coated with a hydrogen ion conductive polymer electrolyte on the surface thereof and a water repellent material attached to the outer surface of the catalyst particle, can be produced by spraying a solution or dispersion of a hydrogen ion conductive polymer electrolyte into a dry atmosphere in which a catalyst particle comprising an electrically conductive carbon powder carrying a platinum group metal catalyst is flowing, thereby coating the catalyst particle with the polymer electrolyte; and then spraying a solution or dispersion of a water repellent material to the catalyst particle coated with the polymer electrolyte, thereby attaching the water repellent material to the catalyst particle.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
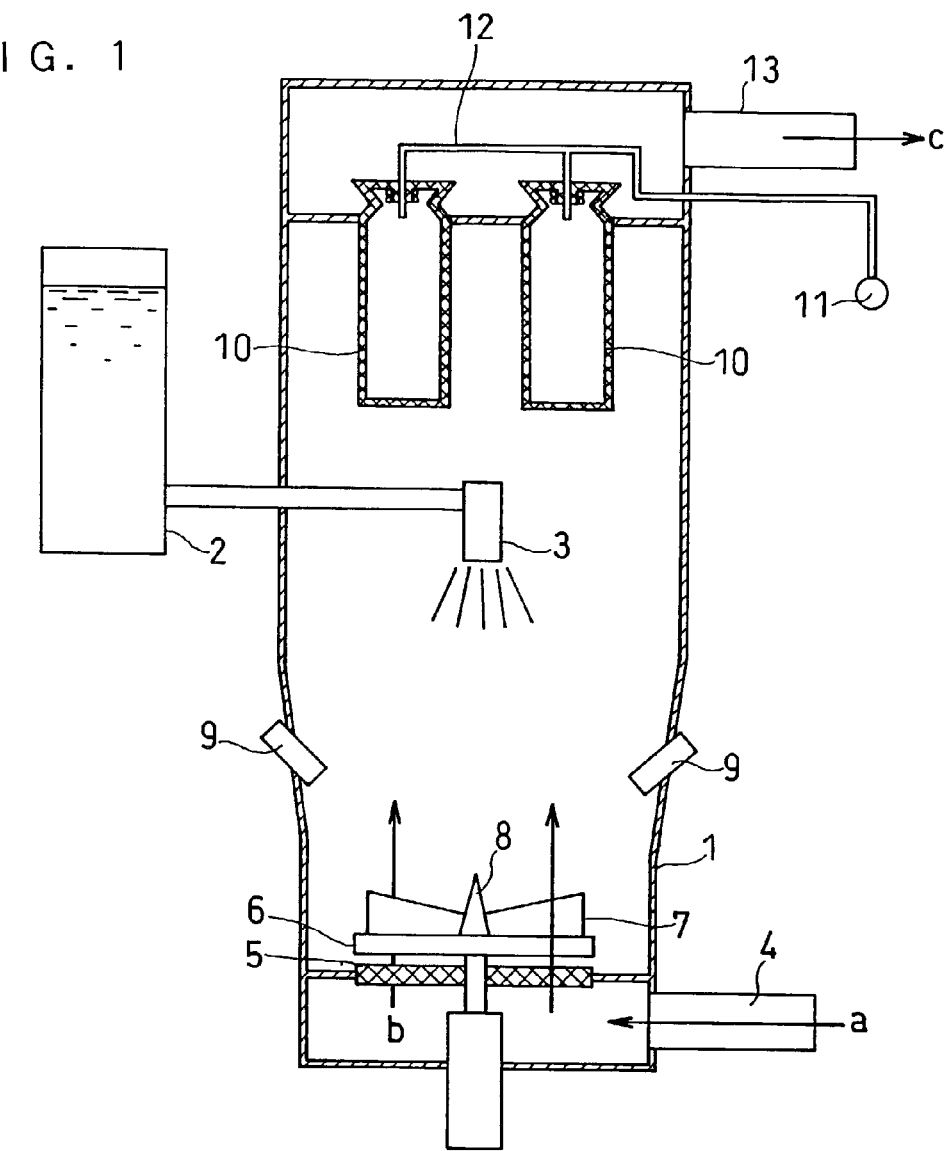
FIG. 1 is a vertical sectional view schematically illustrating an apparatus for producing an electrode particle used in Examples of the present invention.
Figure 2:
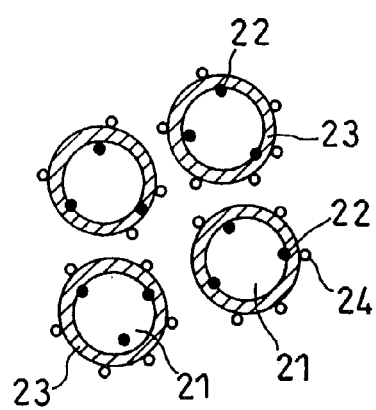
FIG. 2 is a diagram showing a model of electrode particles in accordance with the present invention including carbon powder 21, catalyst 22, hydrogen ion conductive polymer electrolyte 23 and water repellent material 24.

As described above, the electrode for a polymer electrolyte fuel cell in accordance with the present invention comprises a catalyst layer comprising: a catalyst particle comprising an electrically conductive carbon powder carrying a platinum group metal catalyst; a hydrogen ion conductive polymer electrolyte; and a water repellent material, wherein the catalyst particle is coated with the hydrogen ion conductive polymer electrolyte on a surface thereof and the water repellent material is attached to an outer surface of the catalyst particle coated with the polymer electrolyte, the catalyst particle, the hydrogen ion conductive polymer electrolyte and the water repellent material constituting a granulated particle.

It is preferable that the amounts of the hydrogen ion conductive polymer electrolyte and the water repellent material in the granulated particle are 40 to 120 parts by weight and 5 to 30 parts by weight, respectively, per 100 parts by weight of the catalyst particle. The preferable amount of the hydrogen ion conductive polymer electrolyte varies depending on the specific surface area of an electrically conductive carbon powder constituting a catalyst particle. In the case of an electrically conductive carbon powder having a large specific surface area, for example, an electrically conductive carbon powder sold under the trade name of Ketjen Black having a specific surface area of about 800 $m^2/g$, the preferable amount is 80 to 120 parts by weight per 100 parts by weight of the catalyst particle. In the case of an electrically conductive carbon powder having a relatively small specific surface area, for example, acetylene black having a specific surface area of about 70 $m^2/g$, the preferable amount is 40 to 80 parts by weight per 100 parts by weight of the catalyst particle.

The present invention provides a method of producing an electrode for a polymer electrolyte fuel cell, comprising the steps of:

(a) spraying a solution or dispersion of a hydrogen ion conductive polymer electrolyte into a dry atmosphere in which a catalyst particle comprising an electrically conductive carbon powder carrying a platinum group metal catalyst is flowing, thereby coating the catalyst particle with the polymer electrolyte; and (b) spraying a solution or dispersion of a water repellent material into a dry atmosphere in which the catalyst particle coated with the polymer electrolyte is flowing, thereby attaching the water repellent material to the catalyst particle coated with the polymer electrolyte.

In a preferred embodiment, the step (a) comprises grinding the catalyst particle coated with the polymer electrolyte.

In another preferred embodiment, the step (b) comprises grinding the catalyst particle which is coated with the polymer electrolyte and has the water repellent material attached thereto.

In still another preferred embodiment, the above-described method further comprises granulating the catalyst particle in combination with the grinding, and repeating the grinding and the granulating.

In a preferred embodiment, a solvent or dispersion medium of the solution or dispersion of the hydrogen ion conductive polymer electrolyte and a solvent or dispersion medium of the solution or dispersion of the water repellent material are mainly composed of water. More preferably, 99% or more of the solvents or dispersion mediums of the solutions or dispersions are composed of water.

It is preferable that an electrode particle of the present invention is a granulated particle produced by granulating a catalyst particle having a particle size of less than 150 nm to a particle size of 3 µm to 15 µm.

In the following, the embodiments of the present invention will be described with reference to FIG. 1.

FIG. 1 is a conceptual diagram showing a spray drying apparatus used for producing an electrode particle of the present invention. A container 1 is formed by connecting a lower cylindrical container, a cylinder member having a taper such that the diameter increases toward the upper portion thereof, and an upper cylindrical container. Provided at the lower portion of the container 1 is a heater-equipped gas inlet pipe 4, through which a nitrogen gas controlled to have a constant temperature is introduced for creating a dry atmosphere inside the container. In the lower portion of the container 1, a metal filter 5 is provided for preventing dusts from entering into the container. Above the metal filter 5, a granulation plate 6 having a large number of air vents, and a stirring blade 7, which is fixed on the granulation plate and has a collision target 8 disposed at the center thereof, are rotatably provided. Disposed on the wall of the container, which is located above the above-described parts, is a pair of compressed gas jet nozzles 9, from which a high-pressure gas is jetted toward the collision target 8. In the middle portion of the container 1, a high-pressure spray 3 is provided. The high-pressure spray 3 sprays, into the container, a solution or dispersion of a hydrogen ion conductive polymer electrolyte, or a solution or dispersion of a water repellent material, each of which is contained in a container 2. In the upper portion of the container 1, bag filters 10 are provided. Into each of the bag filters 10, a pipe 12 for jetting a compressed gas supplied from a pump 11 is inserted. The compressed air is suitably jetted from the pump 11, via the pipe 12, into each of the bag filters 10 in order to filter off powders and the like attached to the outer surfaces of the bag filters. At the top portion of the container, a gas exhaust pipe 13 is provided.

In order to produce an electrode particle with the above-described apparatus, firstly, catalyst particles are charged onto the granulation plate 6 in the container 1. Subsequently, a solution or dispersion of a hydrogen ion conductive polymer electrolyte or of a water repellent material is sprayed into the container from the high-pressure spray 3. The catalyst particles in the container 1 are blown up toward the upper portion of the container by a nitrogen gas at a constant temperature being supplied from the gas inlet pipe 5. The nitrogen gas supplied from the gas inlet pipe 5 is blown up from the metal filter 5 and the granulation plate 6 toward the upper portion of the container, along the arrows "a" and "b", each indicating the gas flow direction. The granulation plate 6 has ventilation slits, which are opened such that flow rate therethrough increases in the direction of the circumference of the granulation plate. Flowing air generated by gas that has passed through the granulation plate 6 causes the catalyst particles charged in the container 1 to flow toward the upper portion of the container, where the solution or dispersion of the polymer electrolyte or of the water repellent material is attached to the catalyst particles and the whole is dried.

The catalyst particles with the polymer electrolyte and/or water repellent material attached thereto precipitate onto the granulation plate 6, and then are granulated on the rotating granulation plate 6. The stirring blade 7 rotates at a high speed to grind the particles being precipitating thereon. The flowing catalyst particles are ground into lower-order particles by jet grinding with a pulse-jet intermittently jetted from the compressed gas jet nozzle 9 to the collision target 8. The nitrogen gas supplied into the system is exhausted through the exhaust pipe 13 to the outside of the system, with the electrode particles and the solidified powders of the polymer electrolyte and water repellent material being filtrated therefrom by the bag filters 10 placed on the upper portion in the container.

With the use of the above-described apparatus, it is possible to spray a solution or dispersion of a hydrogen ion conductive polymer electrolyte to catalyst particles and to dry the whole, thereby attaching the hydrogen ion conductive polymer electrolyte to the catalyst particles, while granulating the catalyst particles to a suitable particle size. That is, the sprayed solution or dispersion of a hydrogen ion conductive polymer electrolyte is attached on the surface of the catalyst particles and the catalyst particles are then dried to vaporize the solvent or dispersion medium, so that it is possible to attach only the hydrogen ion conductive polymer electrolyte on the surface of the catalyst particles, uniformly. Moreover, by additionally performing grinding, the catalyst particles are finely ground,(e.g., a higher-order multinary particle is ground into a lower-order multinary particle). As a result, the hydrogen ion conductive polymer electrolyte can be uniformly attached to the entire catalyst particle, including the surface thereof. The catalyst particles thus coated with the polymer electrolyte substantially entirely, are then caused to flow in a dry atmosphere, where a solution or dispersion of a water repellent material is sprayed to the catalyst particles coated with the polymer electrolyte, thereby attaching the water repellent material mainly to the outer surface of the catalyst particles coated with the polymer electrolyte. Herein, two separate high pressure spays may be provided: one for the solution or dispersion of a polymer electrolyte and the other for the solution or dispersion of a water repellent material.

EXAMPLE 1

A conductive carbon particle having an average primary particle size of 30 nm, namely, Ketjen Black EC (manufactured by AKZO Chemie Company of the Netherlands) was allowed to carry a platinum particle having an average particle size of about 30 Å in a weight ratio of 1:1. The particle thus obtained was used as a catalyst particle for an air electrode. Separately, Ketjen Black EC was allowed to carry a platinum particle and a ruthenium particle, each having an average particle size of about 30 Å, in a weight ratio of 50:25:25. The particle thus obtained was used as a catalyst particle for a fuel electrode.

With the use of the apparatus shown in FIG. 1, each of the above-described catalyst particles was firstly coated with a hydrogen ion conductive polymer electrolyte on the surface thereof, and then with a water repellent material, thereby giving a granulated particle. Herein, perfluorocarbon sulfonic acid solution having a concentration of 10 wt % (SE 10072, manufactured by E.I. Du Pont de Nemours & Co. Inc.) was employed as the hydrogen ion conductive polymer electrolyte. 85 wt % or more of the solvent of this solution was composed of water. A dispersion of a tetrafluoroethylene-hexafluoropropylene copolymer (Neoflon FEP, manufactured by DAIKIN INDUSTRIES, LTD.), which had been diluted five times with water, was employed as the water repellent material.

The conditions under which the electrode particles were produced are as follows:

Amount of catalyst particle charged: 40 g

Amount of hydrogen ion conductive polymer electrolyte solution used: 185 g

Amount of water repellent material dispersion used: 3.5 g

Spraying velocity of solution or dispersion from high-pressure spray 3: 2.0 g/min Nitrogen gas inlet temperature: 120° C., Nitrogen gas flow rate: 0.06 m³/min Rotational speed of stirring blade 7: 300 rpm On/off interval of pulse-jet 9: 1 time/12 sec Each of the thus obtained electrode particles for the fuel electrode and air electrode had, at the state of the lower-order particle thereof, the hydrogen ion conductive polymer electrolyte and water repellent material each uniformly placed on the surface thereof, and had an average particle size of 5 μm. Herein, immediately after completing the spraying of the hydrogen ion conductive polymer electrolyte solution, the spraying of the dispersion of the water repellent material was started. Then, after completing the spraying of the dispersion of the water repellent material, the apparatus was operated for 30 minutes to continue the drying, granulation and grinding of the particles.

The electrode particles were mixed with ethylene glycol in a nitrogen atmosphere to prepare ink pastes for catalyst layer for the air electrode and fuel electrode, respectively. The respective pastes for catalyst layer were applied, by screen printing, onto the front and back surfaces of a hydrogen ion conductive polymer electrolyte membrane (Nafion 112, manufactured by E.I. Du Pont de Nemours & Co. Inc.) having outer dimensions of 20 cm×32 cm, thereby forming catalyst layers for the air electrode and fuel electrode. The amount of the catalyst metal contained in each of the thus formed catalyst layers was adjusted to 0.5 mg/cm². Additionally, the average thickness of each catalyst layer was adjusted to 20 μm.

Meanwhile, carbon paper, which later served as a gas diffusion layer of the electrode, was subjected to water repellent treatment. More specifically, a carbon nonwoven fabric made of conductive carbon fibers (TGP-H-120, manufactured by Toray Industries, Inc.), having outer dimensions of 16 cm×20 cm and a thickness of 360 μm, was impregnated with an aqueous dispersion of a fluorocarbon resin (Neoflon ND1, manufactured by DAIKIN INDUSTRIES, LTD.), and was then dried and heated at 400° C. for 30 minutes to be imparted water repellency. Subsequently, an ink made of a conductive carbon powder and an aqueous dispersion of polytetrafluoroethylene (PTFE) fine powder mixed therewith was applied, by doctor blading, onto one surface of the carbon nonwoven fabric, thereby forming a water repellent layer. Herein, the water repellent layer was formed such that a part of the water repellent layer was embedded in the carbon nonwoven fabric.

To the front and back surfaces of the hydrogen ion conductive polymer electrolyte membrane having the catalyst layers for the air electrode and fuel electrode formed thereon, a pair of the gas diffusion layers each having the water repellent layer thus formed were bonded, by hot-pressing, such that the water repellent layers thereof were in contact with the catalyst layers, thereby forming a membrane electrode assembly (MEA). At the peripheral portion of the hydrogen ion conductive polymer electrolyte membrane of the MEA, a pair of gasket plates each made of rubber were bonded, and manifold apertures for distributing a cooling water as well as fuel and oxidant gases were formed.

Meanwhile, separator plates were prepared, each of which was made of a resin-impregnated graphite plate having outer dimensions of 20 cm×32 cm and a thickness of 1.3 mm and had gas flow channels or cooling water flow channels each having a depth of 0.5 mm provided thereon. A separator plate having an oxidant gas flow channel was placed on one side of the MEA, and a separator plate having a fuel gas flow channel was placed on the other side to produce a unit cell. One hundred of the unit cells were stacked, with a separator plate having grooves as a cooling water flow channel provided on the back surface thereof inserted between every two cells, and were assembled into a cell stack. At each of the both ends of the cell stack, an end plate was placed, together with a current collector plate made of stainless steel and an electrically insulating plate, and the two end plates were fixed with clamping rods. The clamping pressure applied was 15 kgf/cm² per unit area of the separator plate.

COMPARATIVE EXAMPLE 1

A fuel cell was assembled using an electrode particle produced in the same manner as in Example 1, except that the dispersion of the water repellent material was not sprayed.

COMPARATIVE EXAMPLE 2

A fuel cell was assembled using an electrode particle produced in the same manner as in Example 1, except that the spraying of the solution of the hydrogen ion conductive polymer electrolyte was conducted after the spraying of the dispersion of the water repellent material.

COMPARATIVE EXAMPLE 3

Catalyst particles were coated with a hydrogen ion conductive polymer electrolyte and a water repellent material under the same conditions as in Example 1, except for using a mixed solution previously prepared by mixing the total amounts of the solution of the hydrogen ion conductive polymer electrolyte and the dispersion of the water repellent material.

COMPARATIVE EXAMPLE 4

Two spray nozzles were placed in the apparatus, and catalyst particles were coated with a hydrogen ion conductive polymer electrolyte and a water repellent material by simultaneously spraying the solution of the hydrogen ion conductive polymer electrolyte and the dispersion of the water repellent material from the respective spray nozzles.

Each of the polymer electrolyte fuel cells produced in Example 1 and Comparative Examples 1, 2, 3 and 4 was maintained at 80° C., and hydrogen gas humidified and heated to have a dew point of 75° C. was supplied to the fuel electrode, and air humidified and heated to have a dew point of 70° C. was supplied to the air electrode. Thereafter, each fuel cell was operated under the conditions of a fuel utilization rate of 70% and an air utilization rate of 40% to examine the current-voltage characteristics. The results are shown in FIG. 3.

Figure 3:
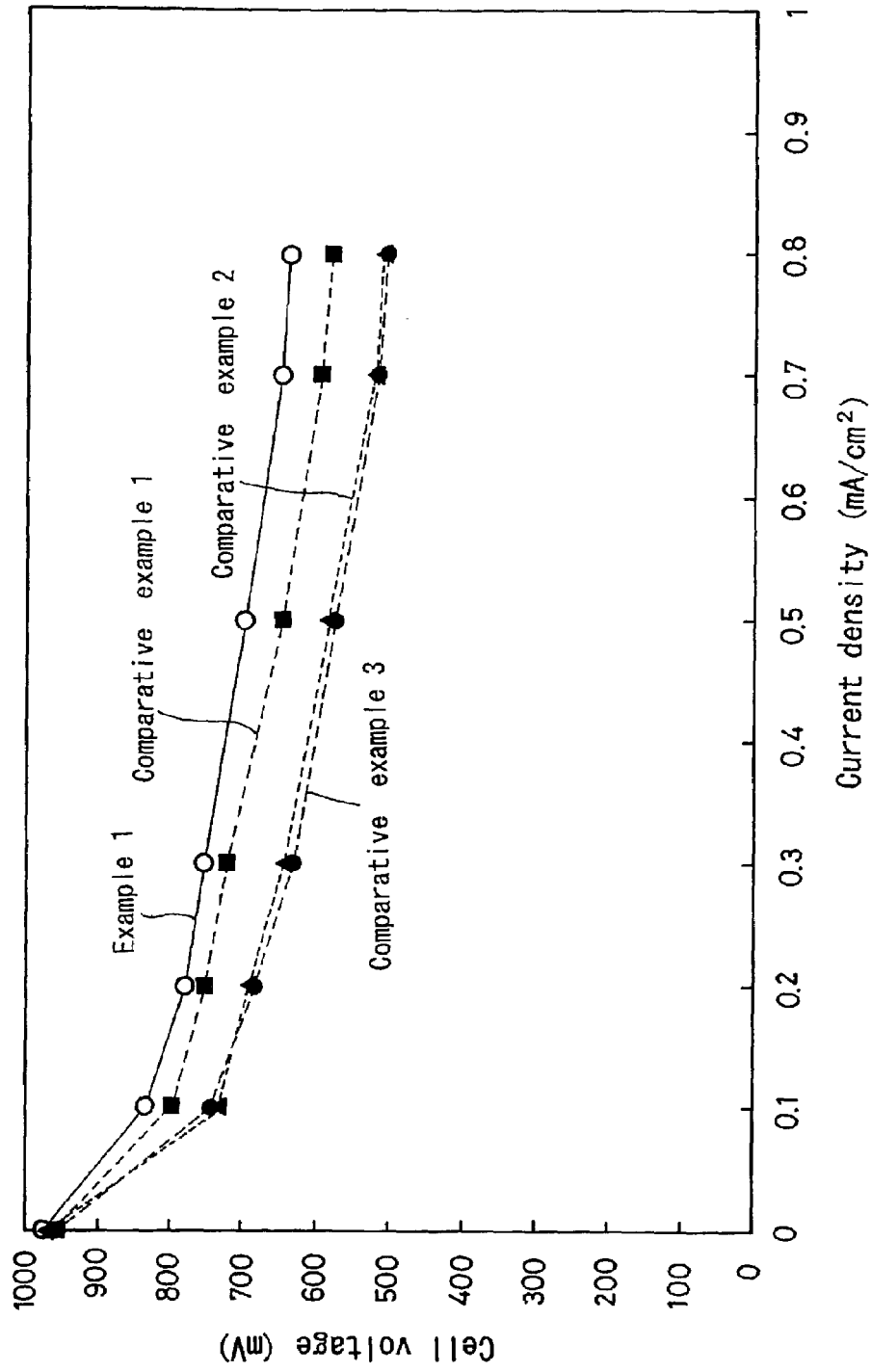
FIG. 3 is a graph showing the polarization characteristics of the fuel cells of Examples of the present invention and Comparative Examples.

FIG. 3 shows that the polarization characteristic of the cell of Comparative Example 1 was inferior to that of the cell of Example 1. This was considered to be attributed to that the water management was insufficient since the catalyst layer of Comparative Example 1 did not contain a water repellent material. On the other hand, each of the cells of Comparative Examples 2, 3 and 4 exhibited a further inferior polarization characteristic. The reason was presumably that the outermost surface of the catalyst particle, i.e., part of the surface of the catalyst metal such as platinum, was undesirably coated with the water repellent material since the hydrogen ion conductive polymer electrolyte and the water repellent material were simultaneously sprayed, or the hydrogen ion conductive polymer electrolyte was sprayed after spraying the water repellent material.

In the above examples, the ink paste for catalyst layer was prepared by mixing an electrode particle with ethylene glycol. It was confirmed that the use of butanol, isopropanol, hexane or heptane as the medium for preparing the ink paste for catalyst layer similarly achieved a high performance.

EXAMPLE 2

With the use of the same apparatus and materials as those of Example 1, catalyst particles for a fuel electrode and an air electrode were each coated with a hydrogen ion conductive polymer electrolyte and a water repellent material. Herein, after completing the spraying of a solution of the hydrogen ion conductive polymer electrolyte, the apparatus was operated for 30 minutes to continue the operations of the stirring blade and jet nozzles, as well as the supplying of nitrogen gas. Thereafter, a dispersion of the water repellent material was spray-dried to the catalyst particles in the same manner as that used for the hydrogen ion conductive polymer electrolyte. As such, the catalyst particle were coated with the hydrogen ion conductive polymer electrolyte and the water repellent material on the surface thereof. Then, an MEA was produced in the same manner as in Example 1. The unit cell produced in this example exhibited a similar discharge characteristic to that of the unit cell of Example 1.

EXAMPLE 3

With the use of the same apparatus and materials as those of Example 1, catalyst particles for a fuel electrode and an air electrode were each coated with a hydrogen ion conductive polymer electrolyte and a water repellent material. Herein, after completing the spraying of a solution of the hydrogen ion conductive polymer electrolyte, the apparatus was operated for 30 minutes. Thereafter, the catalyst particles were taken out from the apparatus, and were allowed to stand for 12 hours or longer in a dry nitrogen atmosphere. The catalyst particles were then supplied into the apparatus again, and a dispersion of the water repellent material was spray-dried to the catalyst particles in the same manner as that used for the hydrogen ion conductive polymer electrolyte. As such, the catalyst particles were coated with the hydrogen ion conductive polymer electrolyte and the water repellent material on the surface thereof. Then, an MEA was produced in the same manner as in Example 1. The unit cell produced in this example exhibited a similar discharge characteristic to that of the unit cell of Example 1.

COMPARATIVE EXAMPLE 5

Perfluorocarbon sulfonic acid solution having a concentration of 20 wt % (SE 20092, manufactured by E.I. Du Pont de Nemours & Co. Inc.) was employed as a solution of a hydrogen ion conductive polymer electrolyte. 20 wt % of the solvent of the solution was composed of water and the rest was composed of ethanol and propanol. Two spray nozzles were placed in the apparatus. The solution of a hydrogen ion conductive polymer electrolyte and a dispersion of a water repellent material were simultaneously sprayed from the respective spray nozzles. After completing the spraying, the apparatus was operated for two hours, and thereafter, the catalyst particles were taken out from the apparatus. At this time, part of the alcohols remained in the pores of the electrically conductive carbon powder serving as the carrier, were observed to burn. This was attributed to that the catalyst had caused the alcohols to react with oxygen in the air. Evaluation of an MEA produced using this catalyst particle showed an insufficient performance.

In order to prevent such burning of alcohols at the time of taking out the granulated particles from the apparatus, it is preferable that 99% or more of the solvents or dispersion mediums of the solution or dispersion of the polymer electrolyte and of the solution or dispersion of the water repellent material, each used for the spraying, are composed of water.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method of producing an electrode for a polymer electrolyte fuel cell, comprising the steps of:
   (a) spraying a solution or dispersion of a hydrogen ion conductive polymer electrolyte into a dry atmosphere in which a catalyst particle comprising an electrically conductive carbon powder carrying a platinum group metal catalyst is flowing, thereby coating said catalyst particle with said polymer electrolyte; and
   (b) spraying a solution or dispersion of a water repellent material into a dry atmosphere in which said catalyst particle coated with said polymer electrolyte is flowing, thereby attaching said water repellent material to said catalyst particle coated with said polymer electrolyte.

2. The method of producing an electrode for a polymer electrolyte fuel cell in accordance with claim 1, wherein said step (a) comprises grinding said catalyst particle coated with said polymer electrolyte.

3. The method of producing an electrode for a polymer electrolyte fuel cell in accordance with claim 1, wherein said step (b) comprises grinding said catalyst particle which is coated with said polymer electrolyte and has said water repellent material attached thereto.

4. The method of producing an electrode for a polymer electrolyte fuel cell in accordance with claim 2, further comprising granulating said catalyst particle in combination with said grinding, and repeating said grinding and said granulating.

5. The method of producing an electrode for a polymer electrolyte fuel cell in accordance with claim 3, further comprising granulating said catalyst particle in combination with said grinding, and repeating said grinding and said granulating.

6. The method of producing an electrode for a polymer electrolyte fuel cell in accordance with claim 1, wherein a solvent or dispersion medium of said solution or dispersion of a hydrogen ion conductive polymer electrolyte and a solvent or dispersion medium of said solution or dispersion of a water repellent material are mainly composed of water.

* * * * *